United States Patent [19]
Ross

[11] 3,832,900
[45] Sept. 3, 1974

[54] APPARATUS AND METHOD FOR MEASURING THE LEVEL OF A CONTAINED LIQUID

[75] Inventor: Gerald F. Ross, Lexington, Mass.

[73] Assignee: Sperry Rand Corporation, New York, N.Y.

[22] Filed: June 28, 1971

[21] Appl. No.: 157,248

[52] U.S. Cl. ........ 73/290 R, 73/304 R, 324/58.5 B, 324/188, 333/10
[51] Int. Cl. ... G01f 23/28, G01n 23/24, G04f 11/00
[58] Field of Search .......... 73/290 R, 290 V, 304 C, 73/304 R; 324/188, 58.5 R, 58.5 B; 343/5 DP, 13 R; 333/10

[56] References Cited
UNITED STATES PATENTS

| | | | |
|---|---|---|---|
| 2,939,002 | 5/1960 | Guillon et al. | 324/188 X |
| 3,204,180 | 8/1965 | Bray et al. | 324/188 |
| 3,296,862 | 1/1967 | Ziniuk | 73/290 R |
| 3,398,578 | 8/1968 | Dozer | 73/304 R |
| 3,424,002 | 1/1969 | Johnson | 73/290 R |
| 3,572,119 | 3/1971 | Bak | 73/290 R |
| 3,688,194 | 8/1972 | Furois | 324/188 |
| 3,703,829 | 11/1972 | Dougherty | 73/290 R |
| 3,772,697 | 11/1973 | Ross | 343/13 R |

Primary Examiner—Richard C. Queisser
Assistant Examiner—F. Shoon
Attorney, Agent, or Firm—Howard P. Terry; Thomas J. Scott

[57] ABSTRACT

A method and apparatus for measuring the level of a contained liquid, which include a device for generating a baseband pulse signal of subnanosecond duration that is coupled into a transmission line which is immersed in the contained liquid. The surface of the liquid creates a discontinuity at a point on the transmission line which produces a reflection of the baseband pulse signal that propagates back along the transmission line and is coupled into a receiver unit which includes a plurality of coincident detectors. A timing signal produced synchronously with the baseband pulse signal is coupled through a pulse circuit and a delay circuit in the receiver unit. The receiver unit establishes the level of the contained liquid by sensing the space-time coincidence between the baseband pulse signal and the timing signal. A display unit which includes a plurality of indicator lights associated respectively with the plurality of coincident circuits in the receiver unit provides a visual indication of the level of the contained liquid.

7 Claims, 2 Drawing Figures

INVENTOR
GERALD F. ROSS
BY
ATTORNEY

APPARATUS AND METHOD FOR MEASURING THE LEVEL OF A CONTAINED LIQUID

BACKGROUND OF THE INVENTION

1. Field of the Invention

This invention pertains to method and apparatus for determining the level of a contained liquid or the levels of interfaces between a plurality of contained liquids which have a sufficient difference in dielectric coefficient to provide a detectable reflection of an incident baseband pulse.

2. Description of the Prior Art

The prior art contains numerous devices and methods for measuring the level of a liquid or the interface levels between two or more liquids. Various techniques are employed to provide the required measurements, among which are floats coupled to electrical or mechanical sensing systems, devices using sonic or ultrasonic transmitted signals, variable pressure sensing devices, variable capacity sensing devices, devices employing one or more vibratory members immersed in the liquid whose level is to be established, and radiation detection systems.

Flotation type devices suffer from the characteristic of being relatively slow in reacting to changes in the level of the liquid. Systems employing sonic or ultrasonic transmissions become complex when used to measure the surface interface levels of contained liquids because of echoes received from the surfaces of the supporting container.

Prior art radiation detection schemes while providing highly accurate indications of liquid level and responding in extremely short times to changes in the levels of the contained liquids have required very complex and expensive apparatus in order to function properly. Further, the actual determination of the level of the liquid has required the operator of the device to perform an interpolation or integrating function.

SUMMARY OF THE INVENTION

The subject invention provides a method and apparatus for measuring the level of a contained liquid and the level of interface surfaces between liquids having different densities. A pulse generator produces a baseband pulse signal of subnanosecond duration which is coupled through a matched power divider into a transmission line that is at least partially submerged in the liquid whose level is to be determined, and extends through an interface surface between two or more contained liquids. Reflections of the baseband pulse produced by the difference in dielectric coefficients at the surface of the liquid and at the interface surfaces between liquids are propagated back along the transmission line toward the matched power divider. A first input of a receiver unit which includes a plurality of detector circuits is also coupled into the matched power unit and receives the transmitted baseband pulse and the reflected pulses. A timing signal produced synchronously with the baseband pulse signal in the pulse generator is coupled through a delay network to a second input on the receiver unit.

A first transmission line in the receiver unit is connected to the first input to provide a propagation path for the transmitted baseband pulse signal and the reflected pulses and a second transmission line in parallel with the first transmission line provides a propagation path for the delayed timing signal. The delayed timing signal enables the transmitted and reflected pulses to be applied to the same input on the receiver without destructive interference occurring in the receiver between the timing signal and the transmitted pulse thereby producing a time domain duplexer.

The plurality of coincident circuits are connected in parallel between the first and second transmission lines, i.e., one input on each coincident circuit is coupled to a different point along the length of the first transmission line and the other input on each coincident circuit is coupled to a different point along the length of the second transmission line. A coincident signal is generated by the coincident circuit which receives the reflected baseband signal on one input at the same time as the timing signal is received on the other input. Each coincident circuit is coupled to an associated indicator light in a display unit. When a coincident signal is generated, the corresponding indicator light will be illuminated. The number of coincident circuits is dictated by the precision of the measurement required.

The simplicity of the device results from the method of making the measurement which includes delaying the timing signal for a period of time greater than the propagation time of the transmitted pulse through the receiver unit, thereby obviating ambiguous readings due to simultaneous reception of the transmitted baseband pulse signal and the transmitted pulse in the receiver unit.

DESCRIPTION OF THE PREFERRED EMBODIMENT

Figure 1:
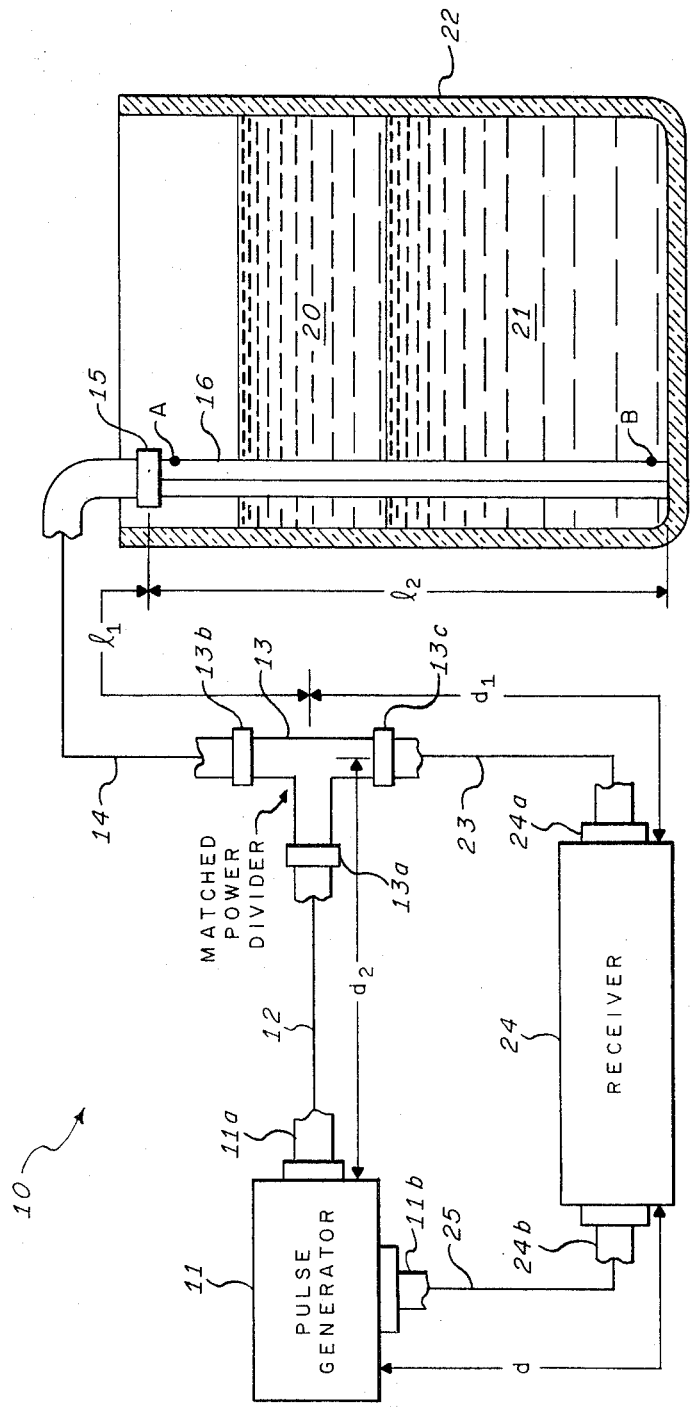
FIG. 1 is a block diagram of the apparatus showing the transmission line immersed in a tank containing two liquids of different dielectric coefficients.

In FIG. 1, a liquid level measuring apparatus 10 includes a pulse generator 11 having a first terminal 11a connected through a length of coaxial line 12 to a first terminal 13a on a matched power divider 13. A second terminal 13b on the matched power divider 13 is connected through a length of coaxial line 14 to a connector and liquid seal 15. Connected to the other side of the connector and liquid seal 15 is a length of open coaxial transmission line 16 which extends in a substantially perpendicular direction to the surface of a fluid 20 which floats on top of another fluid 21 within a container 22. The open coaxial line 16 extends through the liquid 20 and 21 down to the bottom of the container 22.

A third terminal 13c on the matched power divider 13 is connected through a section of coaxial transmission line 23 to an input terminal 24a on a receiver 24. A second terminal 11b on the pulse generator 11 is connected through a coaxial transmission line 25 to a second input terminal 24b on the receiver 24.

In FIG. 1 the effective length of the transmission line 25 is represented by $d$, the effective length of the transmission path between the junction in the matched power divider 13 and the input terminal 24a on the receiver 24 is represented by $d_1$, and the effective length of the transmission path between the pulse generator 11 and the junction in the matched power divider 13 is represented by $d_2$. The effective length of the transmission path between the junction of the matched power divider 13 and the connector and liquid seal 15 is represented by $l_1$ and the effective length of the transmission line 16 is represented by $l_2$.

The pulse generator 11 may be self-synchronizing and of a type generally known in the art. For example, a variety of pulse generators for producing single positive or negative-going pulses or trains of pulses each pulse having a very short duration are well known in the art. Further, it is also well known in the art to adjust delay line pulse generators so that they generate very short electromagnetic pulses. Two such devices for producing very short electromagnetic pulses are disclosed by Hugh C. Maguire in U.S. Pat. No. 3,553,499 entitled "Fast-Acting Avalanche Mode Transistor Switch" issued Jan. 5, 1971 and assigned to the same assignee as the present invention and by G. F. Ross in the U.S. Pat. No. 3,402,370 entitled "Pulse Generator," issued Sept. 17, 1968 and assigned to the United States of America as represented by the Secretary of the Air Force. The pulse generator described in U.S. Pat. No. 3,402,307 provides pulses having durations of small fractions of a nanosecond and utilizes a step waveform which may be produced by a matched source such as a mercury switch and applied to a TEM transmission line. A shorted stub having a characteristic impedance equal to one-half the characteristic impedance of the TEM transmission line is connected at the midpoint of the TEM transmission line. The shorted stub is a section of coaxial cable of electrical length equal to one-half of the desired pulse width that is to be generated at the junction of the shorted stub and the TEM transmission line.

In FIG. 1 the pulse generator 11 produces a subnanosecond pulse at terminal 11a that propagates along coaxial transmission line 12 to the terminal 13a of the matched power divider 13. Two pulses each having one-half the power of the generated pulse received at the first terminal of the matched power divider 13 are transmitted from the terminals 13b and 13c respectively, of the matched power divider 13. The pulse from the second terminal 13b propagates along the transmission line 14 to the connector and liquid seal 15 where it is coupled to the open coaxial transmission line 16 and propagates along its length to the bottom of the container 22. A reflection is created along the open coaxial transmission line 16 at the surface of the liquid 20 due to the discontinuity created by the air-liquid interface. The reflection propagates back along the transmission line 16 to the connector and liquid seal 15 through the transmission line 14 to the second terminal 13b on the matched power divider 13. At the junction of the matched power divider 13 two reflections of one-half the power of the initial reflection created at the liquid-air interface are transmitted from the first and third terminals 13a and 13c of the matched power divider 13. The reflection from the first terminal 13a propagates along the coaxial transmission line 12 into the first terminal 11a of the pulse generator 11 where it is absorbed. The second reflection is transmitted from the third output terminal 13c along the coaxial transmission line 23 into the terminal 24a of the receiver 24.

As the original baseband pulse travels along the open coaxial transmission line 16, passing through the liquid 20 to the interface surface between liquids 20 and 21, a second reflection is created due to the difference in dielectric coefficients between the two liquids. This reflection also propagates back along the open coaxial transmission line 16 to the connector and liquid seal 15 through the coaxial transmission line 14 to the second terminal 13b on the matched power divider 13. In the matched power divider 13 this second reflection is also divided so that a first pulse of one-half the power of the reflected pulse is transmitted from the first terminal 13a on the matched power divider 13 and a second pulse is transmitted at the third terminal 13c on the matched power divider 13. The first pulse from the second reflection also propagates along coaxial transmission line 12 into the pulse generator 11 where it is absorbed. The second pulse from the second reflection propagates along the coaxial transmission line 23 to the terminal 24a on the receiver 24.

The baseband pulse signal on the open coaxial transmission line 16 continues propagating through the liquid 21 until it arrives at the termination of the transmission line 16 at the bottom of the container 22 where a final reflection occurs that is transmitted back along the transmission line 16 in a manner similar to the first and second reflections.

At the same time that the initial baseband pulse signal is generated in the pulse generator 11, a synchronizing signal is generated at the second terminal 11b on the pulse generator 11 which propagates along the coaxial transmission line 25 to the terminal 24b on the receiver 24.

Figure 2:
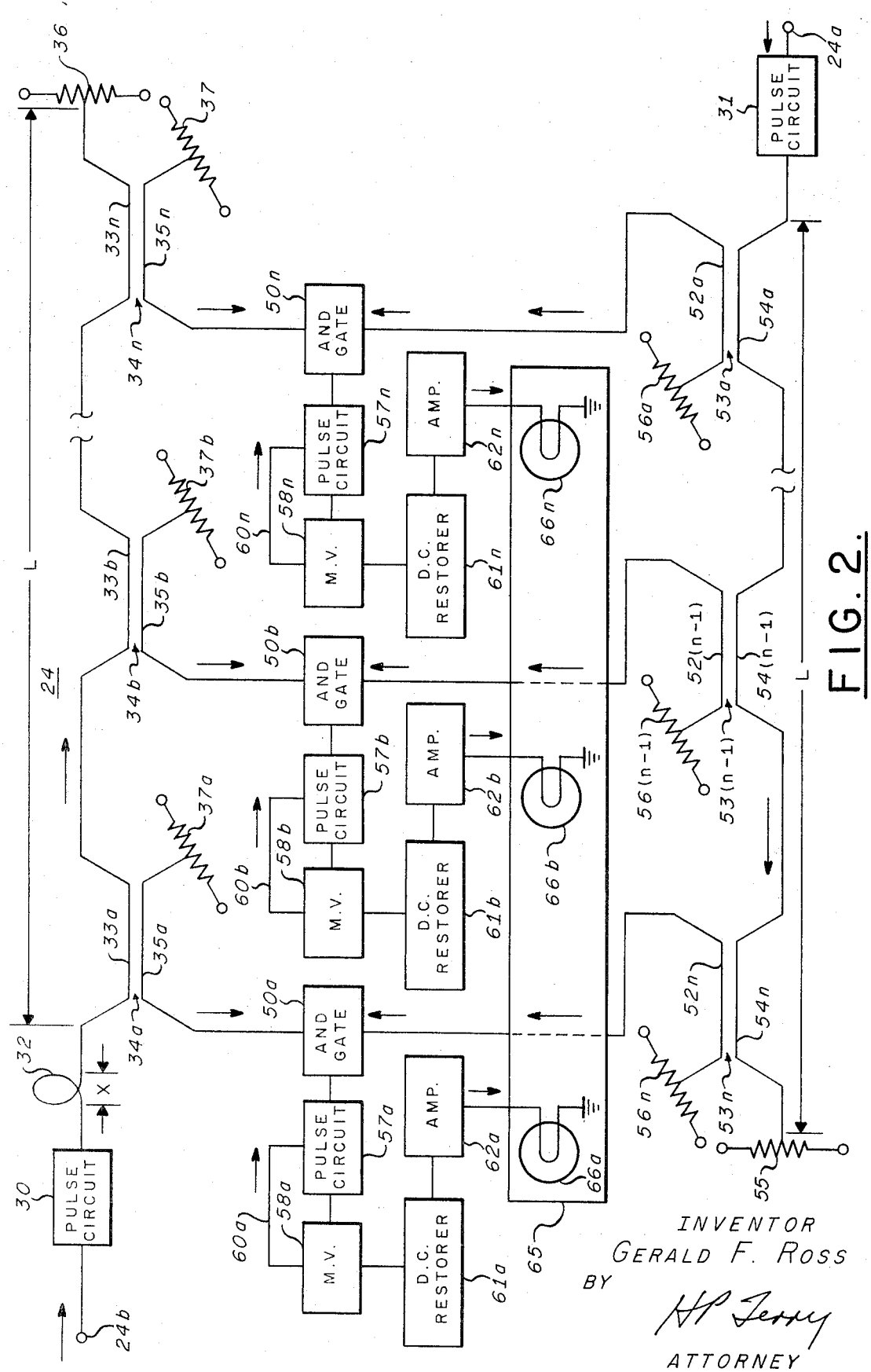
FIG. 2 is a schematic diagram of the ranging unit showing the outputs of the coincident circuits connected to the display unit.

The receiver 24 is shown in detail in the schematic diagram of FIG. 2. The terminal 24b on the receiver 24 is connected to a pulse circuit 30 which is coupled through a delay circuit 32 having an effective length $x$, to a first transmission line. The delay circuit 32 may be a conventional delay line well known in the art. The first transmission line is comprised of a series connected array of input coupling elements 33a, 33b, ..., 33n of respective transmission line directional couplers 34a, 34b...34n having an effective length L. Each coupler 33a, 33b...33n is of a similar type and has a companion output coupling element such as the respective output coupling elements 35a, 35b,..., 35n. A matched load 36 is the termination of the series of input coupling elements 33a, 33b..., 33n. A plurality of similar matched terminations 37a, 37b,..., 37n are the matched loads for the output coupling elements 35a, 35b,... 35n, respectively. Each of the output coupling elements 35a, 35b,..., 35n is coupled to a first input on each of a plurality of corresponding AND gates 50a, 50b, ..., 50n.

The reflection of the baseband signal applied to the receiver 24 at the terminal 24a is coupled through a pulse circuit 31 to a second transmission line comprised of a series connected array of coupling input elements 54a,..., 54(n−1), 54n of directional couples 53a,... 53(n−1), 53n also having an effective length L. Each of the directional couplers 53a,..., 53(n−1), 53n has an associated output coupling element designated 52a,..., 52(n−1), 52n, respectively.

The transmission line directional couplers 342, 34b...34n; 53a,...53(n−1), 53n and AND gates 50a, 50b...50n shown in FIG. 2 may be replaced by time domain multiplexers which employ resistors, capacitors and transistors operating in the breakdown mode to provide very fast gating and coincident pulse generation. A specific advantage of the directional couplers 34a, 34b...34n is that a minimum number of reflections occur in the receiver 24 when they are used, however, they are lossy and due to their physical length the resolution of extremely short duration pulses may be adversely affected.

The termination of the series connected array of input coupling elements $54a,...,54(n-1)$, $54n$ is a matched load 55. a plurality of similar matched terminations $56a,...,56(n-1)$, $56n$ are connected to the output coupling elements $52a,...,52(n-1)$, $52n$ respectively. Further, each of the output coupling elements is also connected to a second input on a corresponding AND gate of the plurality of AND gates $50n...,50b,50a$, respectively. The plurality of AND gates $50a,50b,...,50n$ may be tee junctions of the type disclosed by G. F. Ross in the U.S. Pat. application Ser. No. 23,147, filed Mar. 27, 1970 for an "Energy Coupler and Network and Applications Thereof," and assigned to the Sperry Rand Corporation.

Pulse circuits 30 and 31 are high speed switching circuits known in the art as avalanche transistor circuits or other diode circuits that may be actuated by an input signal having a very short duration. These devices include semiconductors which are characterized by impedance changes which vary very rapidly from a high to a low level. As a result of the very rapid change in impedance, the rise and fall times of the output signal are greatly increased and its duration is determined by the effective length of a properly terminated transmission line which cooperates in the pulse circuit in a conventional manner.

The output terminals of the AND gates $50a,50b,...,50n$ are connected to corresponding pulse circuits $57a, 57b,...,57n$ which have their respective output terminals connected to one shot multivibrators $58a,58b,...58n$. Feedback paths $60a,60b,...,60n$ are provided between each multivibrator and pulse circuit respectively. The output terminal on each multivibrator $58a,58b,...,58n$ is connected to a corresponding conventional d.c. restorer circuit $61a,61b,...,61n$ which produces an output signal that is coupled through associated amplifier circuits $62a,62b...,62n$ to a display unit 65. As shown in FIG. 2, this unit includes a plurality of incandescent lamps $66a,66b,...66n$. The lamps serve as a visual output to an observer that indicates the measure of the liquid level in the container 22. Many other utilization devices are known in the art which may be used in place of the display unit 65, therefore, it is understood that the display unit 65 is presented merely to exemplify the general type of device that may be employed for this purpose.

Since there is no commonly employed duplexing element in the liquid measuring apparatus 10, it would appear that the pulse having one half the power of the generated pulse coupled from the terminal 13c of the matched power divider 13 to the same input terminal 24a on the receiver 24 as the reflected pulse from the transmission line 16 would cause destructive interference with the timing signal within the receiver 24. However, the occurrence of destructive interference is avoided by satisfying the condition that the delay in the effective lengths $d + x$ is greater than the delay in the effective lengths $d_1 + d_2 + L$. This arrangement of effective lengths produces in effect a simple time domain duplexer.

In operation, the synchronizing signal which may also be a subnanosecond duration baseband pulse is coupled from the terminal 24b to the input of the pulse circuit 30 and produces a pulse output having a substantially greater duration and may also have increased amplitude if required. The pulse circuit 30 output signal is coupled through the delay circuit 32 which has a delay time that is greater than the time required for the initial baseband subnanosecond pulse to propagate through the transmission line 12, the pulse circuit 31, and the series connected array of coupling elements $54a,...54(n-1)$, $54n$ to the termination 55.

This feature of the receiver unit 24 eliminates the possibility of an erroneous measurement of liquid level being indicated due to coincidence in the receiver unit between the initial baseband pulse signal of subnanosecond duration and the synchronizing signal.

After the synchronizing signal passes through the delay circuit 32, it propagates through each of the input coupling elements $33a,33b...33n$ to the matched load 36 where it is absorbed. As the synchronizing signal passes through each input coupling element, a version of the synchronizing signal is sequentially coupled through each output coupling element to the first input on each of the corresponding AND gates.

Reflections from the air liquid interface and/or the interface between the liquids in the container 22 are received at the terminal 24a and applied to the pulse circuit 31 where a longer duration corresponding pulse is produced and propagates through the input coupling elements $54a,...,54(n-1)$, $54n$ to the matched load termination 55, where it is absorbed. A version of this longer duration reflected pulse is sequentially coupled to the corresponding output element $52a,...,52(n-1)$, $52n$ and coupled into the second input terminal on the associated AND gates.

When there is coincidence between the signals applied at the first and second inputs of a specific AND gate, an output coincident pulse is produced which is coupled into the corresponding pulse circuit. A longer duration pulse which may have increased amplitude, if required, is produced at the output of the pulse circuit and applied to its associated one shot multivibrator circuit. The pulse circuit output pulse is fed back through its respective feedback path where its trailing edge is used to reset the pulse circuit. The output signal from the multivibrator is applied to the corresponding d.c. restorer and coupled through an associated amplifier, if required, to a corresponding lamp in the display unit 65.

Assume the container 22 in FIG. 1 is at its highest level, at point A on transmission line 16. The pulse generator 11 produces a subnanosecond baseband pulse which propagates along transmission line 12 through power divider 13 where a one-half power pulse is coupled from the third terminal 13c on the power divider 13 through transmission line 23, through terminal 24a, pulse circuit 31 and input coupling elements $54a,...54-(n-1),54n$ and is absorbed in matched load 55. At the same time the pulse generator 11 also produces a synchronizing signal which is coupled through transmission line 25, input terminal 24b, pulse circuit 30 and propagates out of delay circuit 32 after the baseband subnanosecond duration pulse is absorbed in the matched load 55. A one-half power baseband subnanosecond pulse is coupled through the second terminal 13b on the matched power divider 13 through the transmission line 14, the connector and liquid seal 15 to the transmission line 16 where a reflection is created at point A. This reflection is coupled back through the connector and liquid seal 15, the transmission line 14, the matched power divider 13, the transmission line 23, the terminal 24a and applied to the pulse circuit 31. A longer duration pulse is coupled through the input coupling elements 54a,...,54(n-1) to the input coupling element 54n. Simultaneously, the pulse from the delay line 32 is coupled into the input coupling element 33a. Coincident pulses are coupled from the output coupling element 35a to the first input terminal of the AND gate 50a and from the output coupling element 52n to the second input terminal on the AND gate 50a.

The AND circuit 50a produces a coincident output signal that activates the pulse circuit 57a and provides a longer duration pulse which triggers the multivibrator 58a. The longer duration pulse is coupled back through feedback path 60a resetting the pulse circuit 57a so that it will be in a condition to accept a subsequent coincident input signal. The multivibrator circuit 58a produces an output signal that is coupled through the d.c. restorer 61a and the amplifier 52a to the incandescent lamp 66a. Illuminating the lamp 66a provides an indication to an observer that the liquid in the container 22 is at a maximum level.

Alternatively, if the level of the liquid in the tank 22 was at a level corresponding to the point B on the transmission line 16, the pulse from the delay line 32 would have propagated through the input coupling elements 33a, 33b,..., to the input coupling element 33n in the time that the reflection from the air liquid interface at point B on the transmission line 16 has produced a longer duration pulse which is coupled to the input coupling element 54a. Therefore, coincident signals are coupled from the output coupling element 35n to the first input terminal of the AND gate 50n and from the output coupling element 52a to the second input terminal on the AND gate 50n. The coincident output signal from the AND gate 50n activates the succeeding circuitry and illuminates the incandescent lamp 66n in the display unit 65 thereby indicating to an observer that the level of the liquid in the container 22 is at a minimum level.

Intervening levels of the liquid in the container 22 between the maximum and minimum levels would result in illuminating specific lamps between the lamps 66a and 66n. Further, if there were a plurality of liquids floating on top of each other in the tank 22, for example the liquids 20 and 21 shown in FIG. 1, at least two indicating lamps would be illuminated which would provice a measure of the level of the air-liquid surface and the level of the interface between the liquids 20 and 21.

To insure that coincidence occurs in the receiver 24 between the output pulses of the pulse circuits 30 and 31 the following conditions must be satisfied: Assuming that $d_2$ is of negligible length compared to the other effective delays in the apparatus and that $d=d_1$ then $L > 2(l_1 + l_2)$ and $X < 2(l_1 + l_2) + L$ Where: $L$ is the effective length of each transmission path in the receiver 24 comprised of the input coupling elements 33a, 33b,...33n and the input coupling elements 54a,...,54(n-1), 54n, $X$ is the effective length of the delay circuit 32, $l_1$ is the effective length of the transmission line 14, and $l_2$ is the effective length of the transmission line 16.

The time difference between the coincidence output signal produced by the AND circuits 50a, 50b,...,50n is proportional to the difference in the level of the liquid along the transmission line 16. Therefore, in order to detect a difference of one tenth of a foot in the level of the liquid in the container 22 requires that the minimum time difference between the occurrence of coincident output signals from successive AND gates be 0.2 nanoseconds. This time is double that required for a pulse to travel one tenth of a foot because the baseband subnanosecond pulse must first travel down the transmission line 16 to the air liquid interface and the reflection created at the interface must return over the same length which is twice the distance from the connector liquid seal 15.

It must also be kept in mind that the transmission lines employed throughout the device from the pulse generator 11 to the inputs of the AND gates 50a, 50b,...,50n are transmission lines that will support the TEM mode of propagation because of their ability to propagate baseband signals with substantially no distortion. Further, pulse widths having a duration of 0.2 to 0.3 nanoseconds can be generated and propagated along lengths of TEM mode lines of the order of 20 feet without significant dispersion.

While the invention has been described in its preferred embodiment, it is to be understood that the words which have been used are words of description rather than limitation and that changes may be made within the purview of the appended claims without departing from the true scope and spirit of the invention in its broader aspects.

I claim:

1. An apparatus for measuring the level of a contained liquid comprising generator means for producing a subnanosecond pulse signal on a first output terminal and a synchronizing pulse signal on a second output terminal, coupling means having first, second and third terminals, said first terminal being coupled to said first output terminal on said generator means, transmission line means having one end coupled to said second terminal on said coupling means and its other end partially immersed in said liquid for conducting said subnanosecond pulse signal from said generator means through said liquid and conducting reflections of said subnanosecond pulse signal back to said coupling means, receiver means including first receiver transmission line means coupled to said third terminal on said coupling means for receiving said subnanosecond pulse signal and said reflection of said subnanosecond pulse signal, second receiver transmission line means coupled to said second output terminal on said generator means for receiving said synchronizing pulse signal, and coincident detector means coupled between said first and second receiver transmission line means for providing an output signal when said synchronizing pulse signal and said reflections of said subnanosecond pulse signal are spatially and temporally coincident within said first and second receiver transmission lines respectively, duplexing means including delay means coupled between said first output terminal on said generator means and said second receiver transmission line means having a delay time greater than the time required for said subnanosecond pulse signal to propogate through said first receiver transmission line means, and display means coupled to said coincident detector means for producing a visual output indicative of said level of said liquid.

2. An apparatus for measuring the level of a contained liquid as described in claim 1 in which said coincident detector means includes a plurality of AND gates connected in parallel between said first and second receiver transmission line means each of said AND gates having a first input terminal connected to said first receiver transmission line means and a second input terminal connected to said second receiver transmission line means, pulse circuit means coupled to said AND gates for providing a longer duration output pulse, and multivibrator means responsive to said longer duration output pulse for producing an output signal indicative of coincidence and for feeding back said longer duration output signal to said pulse circuit means thereby automatically resetting said pulse circuit means.

3. An apparatus for measuring the level of a contained liquid as recited in claim 1 in which said delay means includes a length of delay line having a delay time greater than the delay time in said first receiver transmission line means.

4. An apparatus for measuring the level of a contained liquid as recited in claim 1 further including second transmission line means having an effective length $d_2$ being coupled between said first output terminal on said generator means and said first terminal on said coupling means, third transmission line means having an effective length $d_1$ being coupled between said third terminal on said coupling means and said first receiver transmission line means wherein said first receiver transmission line means has an effective length L, fourth transmission line means having an effective length d being coupled between said second output terminal on said generator means and said second receiver transmission line means, said delay means in said duplexing means having an effective delay length $X$ whereby the total time delay in effective delay lengths $X + d$ is greater than the total time delay in effective delay lengths $d_1 + d_2 + L$.

5. A method for determining the level of a contained liquid comprising the steps of exciting a transmission line partially immersed in said liquid with a baseband pulse of subnanosecond duration, generating a synchronized pulse signal simultaneous with said baseband pulse, delaying said synchronized pulse signal for a predetermined time with respect to said baseband pulse, propagating said baseband pulse and a reflection of said baseband pulse produced at said level of said contained liquid from said excited transmission line through a first receiver transmission line in a specified direction, propagating said delayed synchronized pulse through a second receiver transmission line in a direction opposite said specified direction after said baseband pulse has propagated through said first receiver transmission line, detecting spatial and temporal coincidence between said delayed synchronized pulse signal and said reflected pulse signal in one of a plurality of pulse detector circuits connected in parallel between said first and second receiver transmission lines, producing an output signal from said one of a plurality of pulse detector circuits in which said pulses are spatially and temporally coincident, establishing the level of said contained liquid from said detector output signal, and displaying a visual indication of said level of said contained liquid.

6. A method for determining the level of a contained liquid comprising the steps of applying a baseband pulse of subnanosecond duration to one end respectively of first and second transmission lines, said first transmission line having its other end at least partially immersed in said liquid, generating a synchronized pulse signal which is time coincident with said baseband pulse, coupling a reflection of said baseband pulse produced at the surface of said liquid into the same end of said second transmission line as said baseband pulse, delaying said synchronized pulse signal for a period of time greater than the propagation time of said baseband pulse along said second transmission line, coupling said synchronized pulse signal to one end of a third transmission line substantially similar to said second transmission line so that it propagates in a direction opposite to said reflection in said second transmission line, sensing spatial and temporal coincidence between said reflection in said second transmission line and said synchronized pulse signal in said third transmission line in one of a plurality of AND gates in which each gate has one input coupled to said second transmission line and another input coupled to said third transmission line, and providing a coincidence signal from said one AND gate which is indicative of said level of said contained liquid.

7. A method for determining the level of a contained liquid as described in claim 6 which further includes the step of illuminating an indicator light associated with said one AND gate which provided said coincident signal indicative of said level of said contained liquid.

* * * * *